(12) United States Patent
Simonsson

(10) Patent No.: US 8,291,873 B2
(45) Date of Patent: Oct. 23, 2012

(54) VALVE ARRANGEMENT FOR A COMBUSTION ENGINE

(75) Inventor: Per Thomas Simonsson, Karlstad (SE)

(73) Assignee: Engine Solution Sweden Aktiebolag (SE)

( * ) Notice: Subject to any disclaimer, the term of this patent is extended or adjusted under 35 U.S.C. 154(b) by 451 days.

(21) Appl. No.: 12/671,577

(22) PCT Filed: Aug. 6, 2008

(86) PCT No.: PCT/SE2008/050905
§ 371 (c)(1),
(2), (4) Date: Feb. 24, 2010

(87) PCT Pub. No.: WO2009/020426
PCT Pub. Date: Feb. 12, 2009

(65) Prior Publication Data
US 2011/0192363 A1    Aug. 11, 2011

(30) Foreign Application Priority Data
Aug. 6, 2007   (SE) ....................................... 0701834

(51) Int. Cl.
*F01L 1/00*    (2006.01)
(52) U.S. Cl. ................. 123/90.1; 123/198 A
(58) Field of Classification Search ............ 123/90.1, 123/188.3, 198 A
See application file for complete search history.

(56) References Cited

U.S. PATENT DOCUMENTS

| | | |
|---|---|---|
| 1,905,140 A | 4/1933 | Boye |
| 3,757,757 A * | 9/1973 | Bastenhof .................. 123/188.7 |
| 5,020,486 A | 6/1991 | Unger |
| 5,168,843 A | 12/1992 | Franks |
| 5,524,579 A | 6/1996 | Eluchans |
| 6,378,471 B1 | 4/2002 | Yamada et al. |
| 6,848,408 B1 | 2/2005 | Mendler |
| 6,953,018 B2 | 10/2005 | Simonsson |
| 7,028,663 B1 | 4/2006 | Kim |
| 2002/0112470 A1 | 8/2002 | Yamada et al. |
| 2003/0172895 A1 | 9/2003 | Klein et al. |
| 2003/0217725 A1 | 11/2003 | Klein et al. |
| 2003/0221652 A1 | 12/2003 | Armer |

FOREIGN PATENT DOCUMENTS

| | | |
|---|---|---|
| CH | 641244 | 2/1984 |
| DE | 1119594 | 12/1961 |
| DE | 2716309 A1 | 10/1978 |
| DE | 4435443 A1 | 10/1994 |
| DE | 19523304 A1 | 1/1997 |
| EP | 1059423 A2 | 12/2000 |
| EP | 1 081 370 A2 | 3/2001 |
| GB | 346 206 A | 4/1931 |
| JP | 60036706 A | 2/1985 |

* cited by examiner

*Primary Examiner* — Zelalem Eshete
(74) *Attorney, Agent, or Firm* — Joseph T. Leone, Esq.; DeWitt Ross & Stevens S.C.

(57) ABSTRACT

This invention relates to a valve arrangement in an engine, comprising a valve with a valve plate and a stem like portion having an upper portion and lower portion, a valve control mechanism, the upper portion forms a hollow annular body extending coaxially with the extension of the stem like portion, the valve plate is connected to the lower portion to form a gap between the valve plate and the upper portion to allow for the gases to be transported past the valve plate into or out from the inside of the hollow annular body, the upper end of the annular body is open and the hollow annular body at its outer side is arranged with at least one first interacting device arranged to interact with at least one second interacting device of the valve control mechanism to facilitate movement and positioning.

16 Claims, 9 Drawing Sheets

VALVE ARRANGEMENT FOR A COMBUSTION ENGINE

TECHNICAL FIELD

The invention relates to a valve arrangement in a combustion engine for controlling inlet and outlet of gas mixtures, comprising a valve slidably arranged within a housing in a cylinder head of the combustion engine, said valve including a valve plate and a stem like portion, said stem like portion having an upper portion fixedly attached with its lower end to, a lower portion, said lower portion having said valve plate attached thereto which valve plate interacts with a valve seat to allow for outlet and inlet of gases respectively, a valve control mechanism to control the movement and/or position of said valve, wherein said upper portion forms a hollow annular body extending coaxially with the extension of said stem like portion to allow for said gases to be transported through the valve in a channel within and formed in said annular body, the valve plate is connected to the lower portion to form a gap between the valve plate and the upper portion to allow for said gases to be transported past the valve plate into or out from the inside of said hollow annular body.

DESCRIPTION OF THE PRIOR ART

Control of fluid flow within internal combustion engines is an essential and well known part of the operation of combustion engines. Generally a separate intake and exhaust valve of the cam operated poppet type are provided for each engine cylinder. The function of these valves is to direct combustible fluid to the cylinder, seal the cylinder during compression in the cylinder by the piston and expansion after ignition, and to allow for the removal of the exhaust gas. Conventionally designed valves present disadvantages in their design, especially in relation to high performance combustion engines. As an example, at 11 000 rpm a four stroke engine is performing one working cycle 90 times per sec. At a speed of 18 000+ rpm and still performing at high reliability a new mechanical design is needed in order to avoid the performance limits of conventional valve design.

In the past many arrangements have been proposed to improve the control of flow of inlet gases into, and exhaust gases from, the combustion chamber of an internal combustion engine, in exchange of the traditional poppet valve design. For example, from DE 11 19 594, DE 27 16 309 and CH 641 244 there are known designs which intend to improve the flow by modifying the design of how the stem portion of the valve is attached to the valve plate. From EP 1 059 423 there is shown a valve mechanism where the diameter of the tappet portion has been made larger than the diameter of the guide portion, so that the valve lifter can be miniaturized and light-weighted. In U.S. Pat. No. 5,524,579 there is shown a more complex design, comprising a rotary distribution and air cooling valve, consisting of a tube mounted having a pair of opposed side ports and an internal barrier which acts as an air fan to both cool the valve site and channel the gases in and out of the engine in timed sequence. U.S. Pat. No. 5,020,486 shows another (partly)tube formed valve mechanism, which is also very complex, wherein a partition between the inlet and exhaust tracts has gas flow ports there through moving into and out of alignment with similar gas flow ports in the valve stem and wherein the ports are arranged to permit gas flow from the inlet tract to the outlet tract when the valve is closed. In U.S. Pat. No. 5,168,843 and DE 195 23 304 there are disclosed another kind of complex valve design, wherein the valve body includes two annular seals which cooperate with two annular seats to seal the valve when the valve body is in a closed position.

Despite the above different described attempts, to try to overcome problems related to the traditional poppet valve design, they all suffer from one or another disadvantage. From U.S. Pat. No. 6,953,018 there is known a design that eliminates many of the above disadvantages, by providing a solution as mentioned under technical field above. However also this latter novel design has room for improvements to further increase efficiency and operability of a design along the same basic principles.

SUMMARY OF THE INVENTION

The solution according to the invention is based on the use of a valve body basically in the form of a pipe, wherein the upper end of said annular body is open and said hollow annular body at its outer side is arranged with at least one first interacting device arranged to interact with at least one second interacting device of the valve control mechanism to facilitate said movement and positioning.

The design according to the invention provides numerous advantages, by providing improved flexibility in positioning of the valve control mechanism, e.g. laterally in relation to the valve body which leads to the ability of producing a very compact cylinder head and increased flexibility for the positioning of inlet nozzles, which in turn results in increased efficiency of the gas mixture flow, improved mixture efficiency, improved ability for lubrication of the valve, improved cooling of the valve. As understood by the skilled person this may be used to obtain higher output, higher RPM and higher fuel efficiency compared to the existing valve, i.e. a higher output per given cylinder volume.

BRIEF DESCRIPTION OF THE DRAWINGS

In the following the invention will be described in more detail with reference to the enclosed figures, in which.

DETAILED DESCRIPTION

Figure 1:
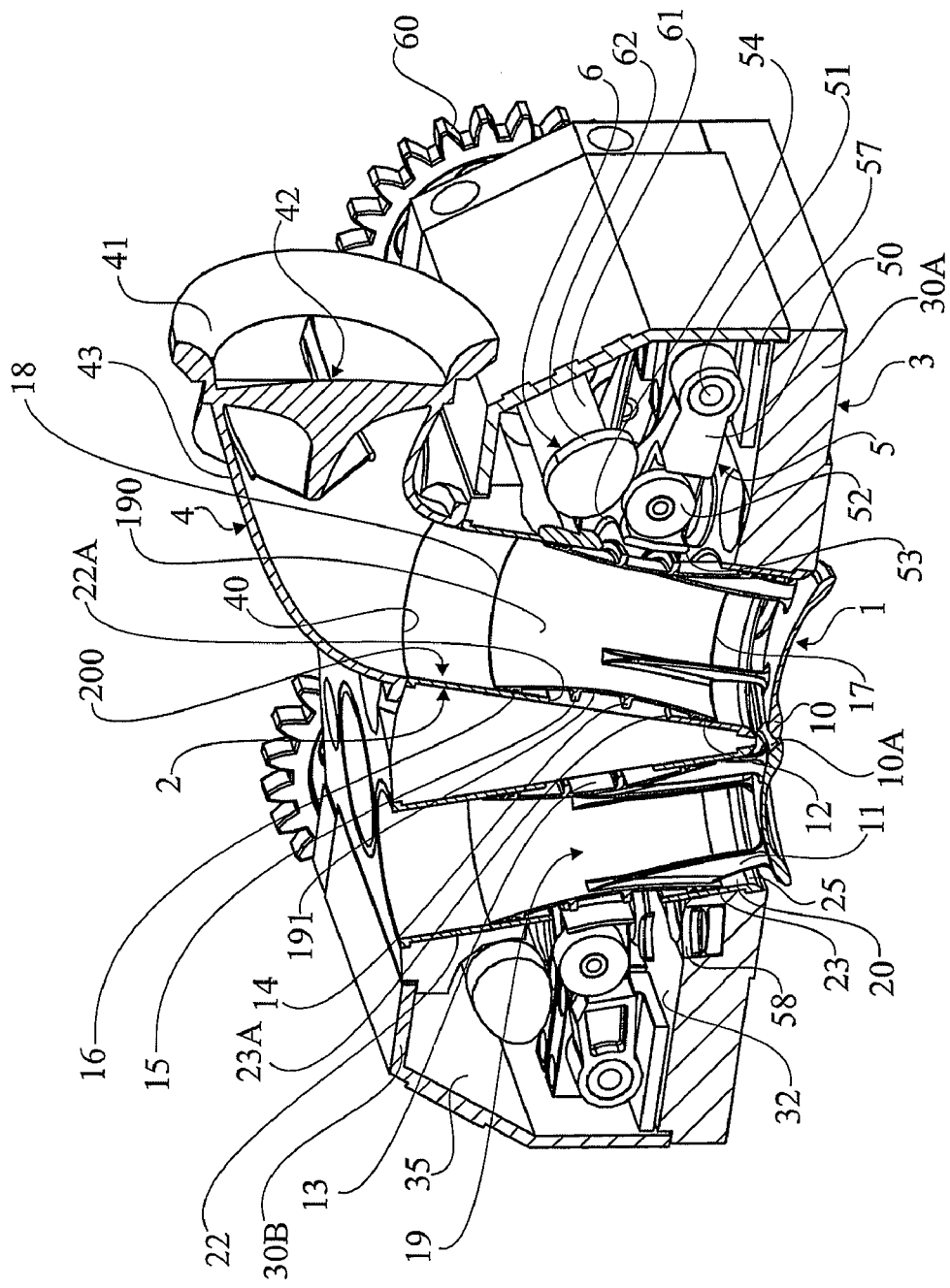
FIG. 1 shows a cross-sectional, perspective side view through a cylinder head equipped with a valve arrangement according to the invention.

In FIG. 1 there is shown a cross-sectional, perspective side view through a cylinder head 3 of a first design according to the invention. The cylinder head 3 comprises a lower portion 30A and an upper portion 30B forming a space 35 them between. Valve housings 2 are arranged within the space 35 passing through the lower 30A and the upper portion 30B. Within the valve housing 2 there is arranged for a valve unit 1 to move in sealing contact with the inner surface 200 of an annular channel 20 formed within the housing 2. Laterally, i.e. side ways in relation to the extension of the housing 2, within the space 35 of the cylinder head 3 there are arranged valve control mechanisms 5, 6 to control the movement and/or position of said valve unit 1.

The valve unit 1 comprises a valve plate 10, a hollow annular body 19 and support rods 11 attaching the valve plate 10 to the hollow annular body 19, to provide a gap between the lower edge 17 of the hollow annular body 19 and the valve plate 10.

The support rods 11 are arranged at the periphery of the valve plate 10 which brings along that the plate 10 may be made very flat to not present any flow disturbing protruding portion at the centre of the plate 10. At the lower end of the valve housing 2 there is arranged a valve seat 25 against which the sealing edge 10A of the valve plate 10 may sealingly be positioned. At the top of the annular channel 20 there is arranged an inlet nozzle 4, which is sealingly attached to the upper end of the annular channel 20 with its lower edge 40. Alternatively, said inlet nozzle 4 may be movably attached to said end of the housing 2, preferably by means of threads, to facilitate adjustment of the position of said nozzle 4 (not shown).

The valve control mechanism comprises a first driving member 6 presenting a traditional kind of dented wheel drive 60 at one end and (known per se and therefore not described more in detail), a shaft 61 driven by said dented wheel and a cam mechanism 62 at the end of the shaft 61. Upon rotation of the shaft 61 the excentric surface of the camming mechanism 62 will interact with a cam wheel 52, having a centric camming surface. The cam wheel 52 is rotatably, fixedly attached to a lifter arm 5. At one end 51 the lifter arm 5 is pivotally attached onto a base unit 57 that in turn is fixedly attached to the base plate 30A of the cylinder head 3. Accordingly the base unit 57 is fixed on to the upper surface 32 of the base plate 30A. At the opposite end of the lifting arm 5 there are arranged interacting means 53, 54 intended to interact with interacting devices 14, 15 attached to the valve unit 1. A resilient return device 58 is arranged to urge the lifting arm 5 in a direction towards the camming mechanism 62.

The interacting devices 14, 15 are fixedly attached to the hollow annular body 19 and form annular protrusions extending from the outer side 191 of the hollow annular body 19, in a transversal direction in relation to the longitudinal extension of the valve unit 1. As a consequence there will be formed a kind of annular recess between said first interacting devices 15, 16, wherein the interacting means 53, 54 of the lifting pin 5 securely can hold and control movement and position of the valve unit 1.

The annular channel 20 wherein the valve unit 1 is movably arranged comprises a lower casing 23 and an upper casing 22. The edges 22A, 23A of the casings do not meet and accordingly there is formed a gap 13 in between said casings 22, 23. Within this gap 13 the interacting portions 53, 54 of the lifting pin 5 may protrude into contact with the interacting devices 14, 15 arranged on the valve unit 1. Hence, there will be formed an outwardly open space 13 in the valve housing 2, which open space 13 can communicate with the rest of the open space 35 within the cylinder head 3.

In order to seal the hollow annular body 19, to not allow gases from the cylinder or inlet nozzle 4 to pass into the space 35 in the cylinder head, there are arranged sealings 12, 16 to seal off between each end of the hollow annular body 19 and each casing 22, 23. The two sealings 12, 16 are fixedly attached to the hollow annular body 19, preferably by being mounted into recesses adjacent each edge 17, 18 of the hollow annular body.

According to the preferred embodiment of the invention the support rods 11 that connect the valve plate 10 with the hollow annular body 19 are formed to have a positive influence on the flow condition of the gas mixtures, such that optimal flow conditions can be achieved in the cylinder. Further also the inlet nozzle 4 has a flow controlling means to assist in creating optimal flow conditions. Preferably by means of flow controlling inserts 42, positioned in the housing 43, extending from the inlet 41 of the inlet device 4. The insert 42 is arranged with partitioning walls 420-423 formed to influence the flow of gas mixture to provide an optimal flow pattern, e.g. swirl as shown in FIG. 1.

Thanks to positioning the valve control mechanism 5, 6 at the same level as the valve unit 1 itself, i.e. substantially within the same horizontally space, a very compact engine may be built. Accordingly the design using first interacting devices 14, 15 at or near the middle of each valve unit 1 and second interacting means 53, 54 arranged onto a transversally positioned lifting arm 5, eliminates the traditional need of having lifting means on top of the valve unit. As a consequence the space above the valve unit 1 may instead be used for positioning flow controlling devices 4 in a much more optimized manner than has been known or possible before. By providing extra long flow paths, thanks to using the space above the valve unit 1, extremely good control of the flow of the gas mixture may be achieved prior to the introduction into the cylinder. As is well understood by the skilled person this might have extremely great impact on the combustion within the cylinder achieving optimal combustion conditions. For instance, this design will allow for much higher swirl than conventional designs, which will increase combustion efficiency. Using a diesel engine as an example, known designs may merely achieve a swirl ratio of about 2.8, whereas the design according to the invention will easily allow for a swirl ratio of 3 and even as high as 4 and above.

Figure 2:
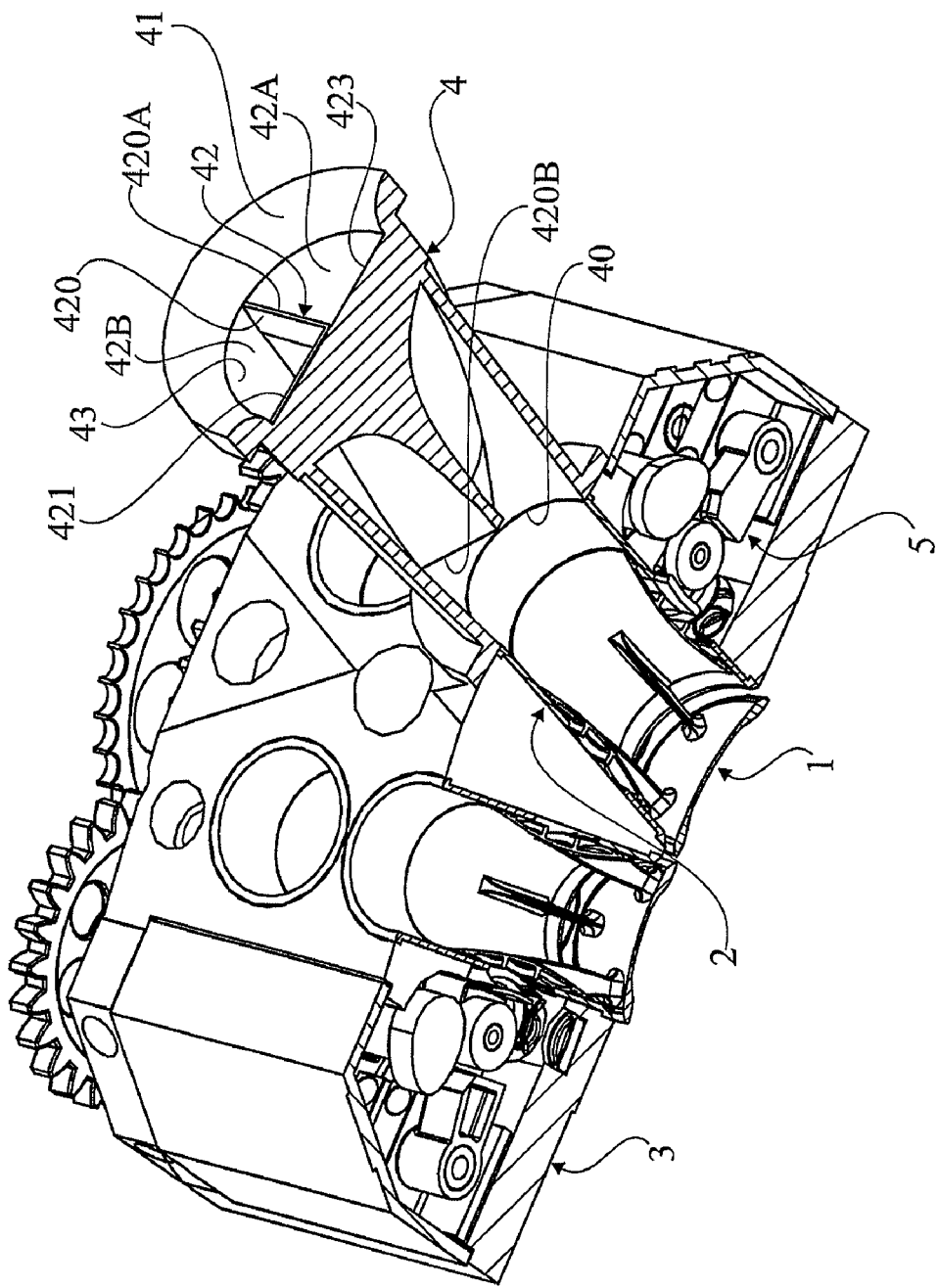
FIG. 2 shows a similar cross-sectional perspective view, but seen more from above and equipped with different inlet nozzle compared to FIG. 2.

In FIG. 2 there is shown a cross-sectional view of an embodiment according to the invention where the valve control mechanism 5, 6 is the same as shown in FIG. 1, and also the valve unit 1, but where the inlet nozzle 4 is shaped in a different manner. As shown the housing 43 of the inlet nozzle 4 of FIG. 2 is designed to extend coaxially with the extension of the valve unit 1, whereas in FIG. 1 the nozzle housing 43 is curved. As already mentioned different designs of the housing and different design of the insert 42 will provide for a wide range of variation of different kind of flows, to be able to adapt to different engine designs to achieve optimal flow conditions. As shown in both FIGS. 1 and 2 there are four partitioning walls 421, 421, 422, 423, (creating sealed flow channels 42A, 42B, etc) intended to provide the desired flow pattern. In FIG. 1 it is shown that the insert 42 extend less than 50% of the distance of the nozzle body 43, whereas in the embodiment according to FIG. 2 it extends more than 50% of the extension and terminates adjacent its lower end 40.

Figure 3:
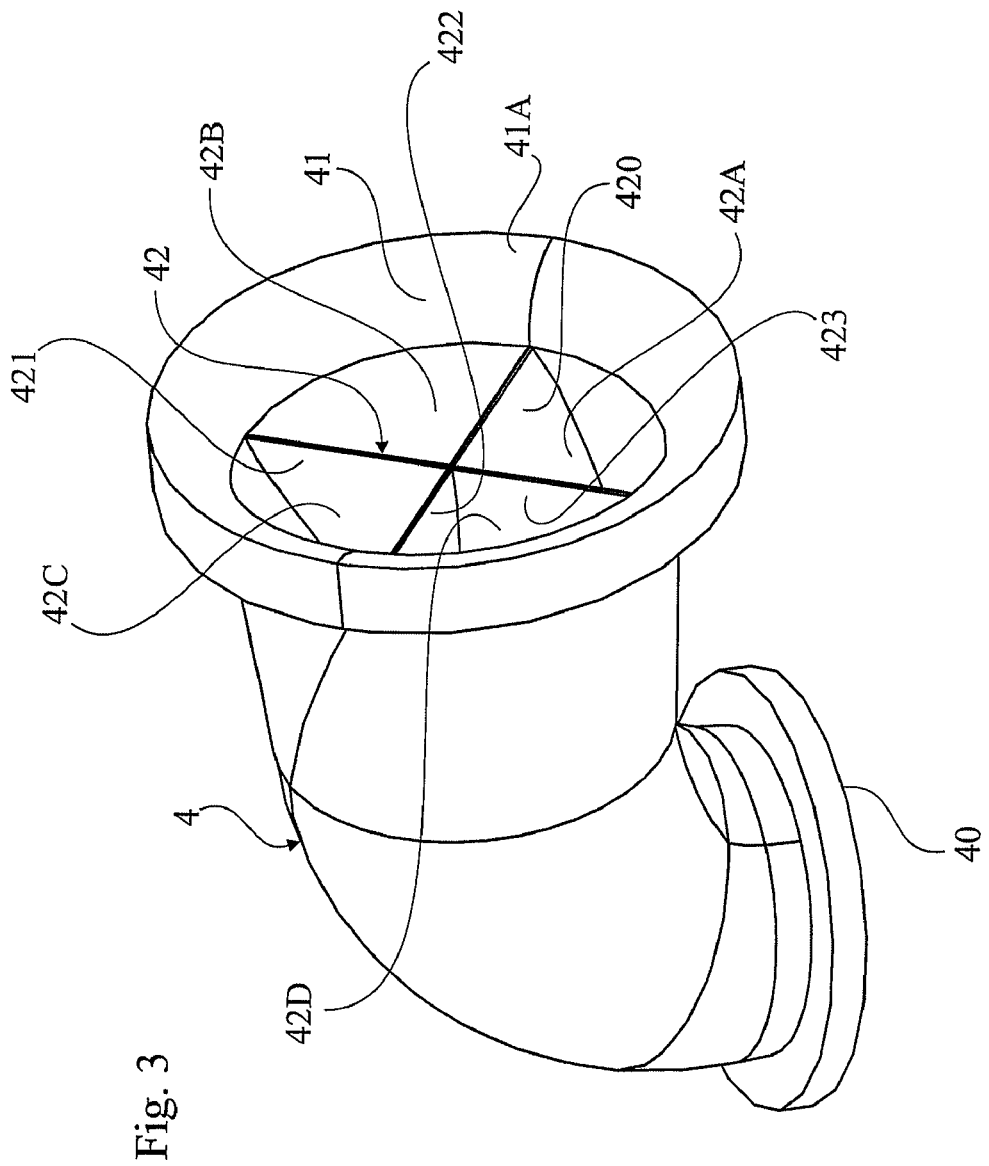
FIG. 3 shows a perspective view of an inlet nozzle presented in FIG. 1.

In FIG. 3 a flow nozzle 4 is shown in a perspective view wherein all four partitioning walls 420, 421, 422, 423 are clearly shown and also each flow channel 42A, 42B, 42C, 42D. Further it is shown that in conjunction with the lower edge 40 there is arranged a flange for attachment thereof onto the upper end of the valve housing 2.

Figure 4:
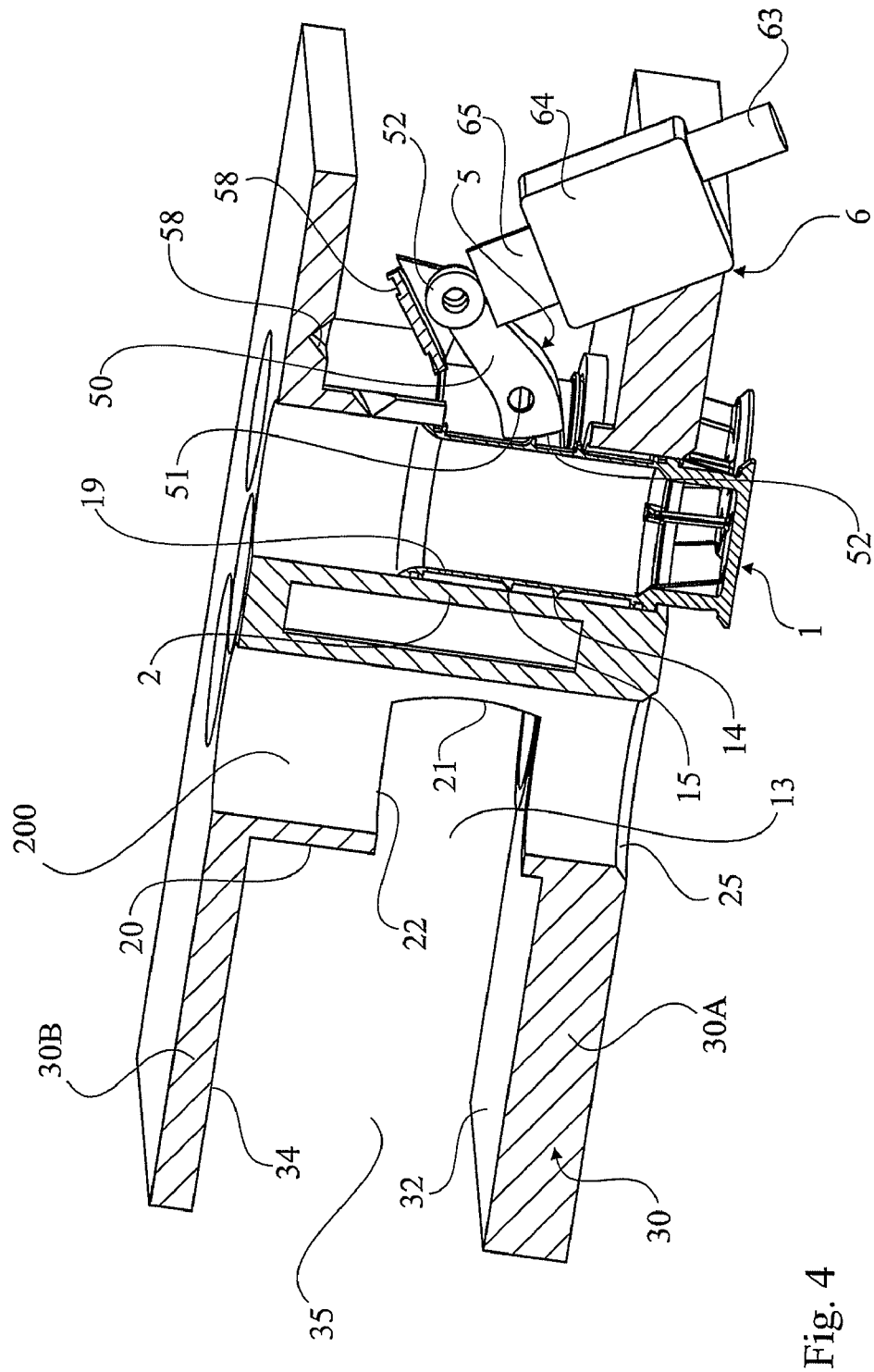
FIG. 4 shows a cross-sectional, perspective view of cylinder head equipped with a somewhat modified valve arrangement according to the invention.

In FIG. 4 there is shown a further modification according to the invention. A first difference relates to the design of cylinder head 3. In FIG. 2 the cylinder head 3 is made up by two separate parts, a lower part 30A made from a relatively thick plate 30A and an upper part 30B made from a thinner metal structure, attached onto the plate 30A. The valve housings 20 in the embodiment shown in FIG. 1 are made by attaching separate casings 22, 23 at the upper end lower parts 30A, 30B respectively, thereby "automatically" creating the needed gap 13 for the lifting arm 5. In FIG. 2 the cylinder head 3 is made up from an integral metal structure formed to have a thicker lower portion 30A and a thinner upper portion 30B. The valve housings 20 (e.g. drilled/milled bores or formed by forging) extend as integral parts between said upper portion 30B and said lower portion 30A. Edges 21A, 21B (e.g. milled or formed by forging) will form the opening 13 providing space for the lifting arm 5.

A further modification shown in FIG. 4 is the use of a hydraulic pusher mechanism 6 instead of cam mechanism. There is shown a hydraulic cylinder body 64 having a supply line 63 for hydraulic fluid and piston 65, protruding upwardly from the hydraulic cylinder body 64. The upper edge of the piston 65 is in contact with a concentric wheel 52 rotatably fixed at one end of the lifting arm 50. The lifting arm is pivotably, fixedly attached to the cylinder head 3 (not shown), such that a movement of the lifting arm 50 will affect the interacting devices 53, 54 (not shown in this cross-section) to move the valve unit 1 by means of interacting with interacting devices 14, 15 of the valve unit 1. A resilient device 58 (merely indicated) will urge the lifting arm 5 to always have its wheel 52 in contact with the piston 65. An advantage with this embodiment is that it facilitates control of the valve that is independent in relation to the rest of the engine, i.e. the movement of the valve may be made asynchronous in relation to engine speed enabling independent optimisation of the movement for closure and opening respectively.

A further modification depicted in FIG. 4 is the design of the valve unit 1 as will be explained more in detail below.

Figure 5:
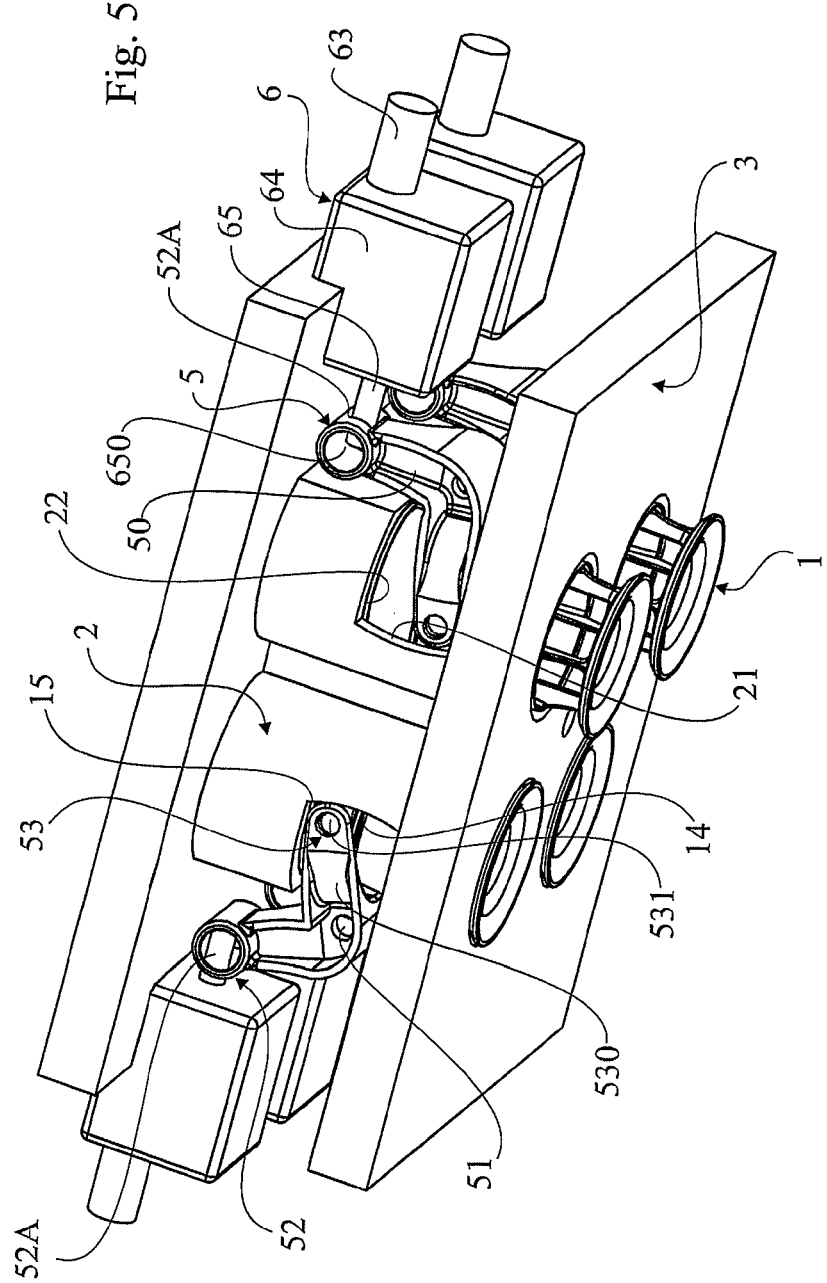
FIG. 5 shows a perspective view from still another modification according to the invention.

In FIG. 5 there is shown a further modification according to the invention, wherein the most essential difference is that the valve units 1 are controlled by the lifting arm 5 in each position without the use of any counter acting resilient force. This is achieved by having a cylinder device 52A attached to one end of the lifting arm 5. Within this tube-like, cylinder device 52A there is formed a recess 520. Inside of the cylindrical device 52A there is arranged another cylindrical body 650 having dimensions such that it may freely rotate within the other cylindrical device 52A.

The inner cylindrical body 650 is fixedly attached to a piston rod 65 that protrudes through the opening 520 in the outer cylindrical device 52A. The opening 520 is sufficiently wide and extends along the circumference a sufficiently distance to allow for pivoting movement of the lifting arm 5 without having the piston rod 65 abutting any end of the opening 520. Accordingly the lifting arm 5 will be totally controlled by the movement of the piston rod 65, which is controlled by the hydraulic cylinder unit 64. Hence, this embodiment presents a design where the movement and positioning of the valve unit 1 may be totally independently controlled to provide for any pattern of movement and/or positioning of the valve unit 1 for operation of a combustion engine. Further, in FIG. 5 a preferred design of the interacting devices 53, 54 (of the lifting arm 5) are presented. From the pivot point 51 the lifting arm extends by means of two arms, that extend along one side each of the valve unit 1, by means of U-shaped yoke 430. Near each end of the yoke 430 there are positioned inwardly protruding knobs 531, 541 which are sized to snugly fit into the gap between the annular protrusions 14, 15 of the hollow annular body 19. A further notable modification is that according to FIG. 5 the hydraulic valve unit 64 is attached to the upper portion 30B of the cylinder head 3, whereas according to FIG. 4 the hydraulic unit 64 is attached to the lower portion 30A.

Figure 6:
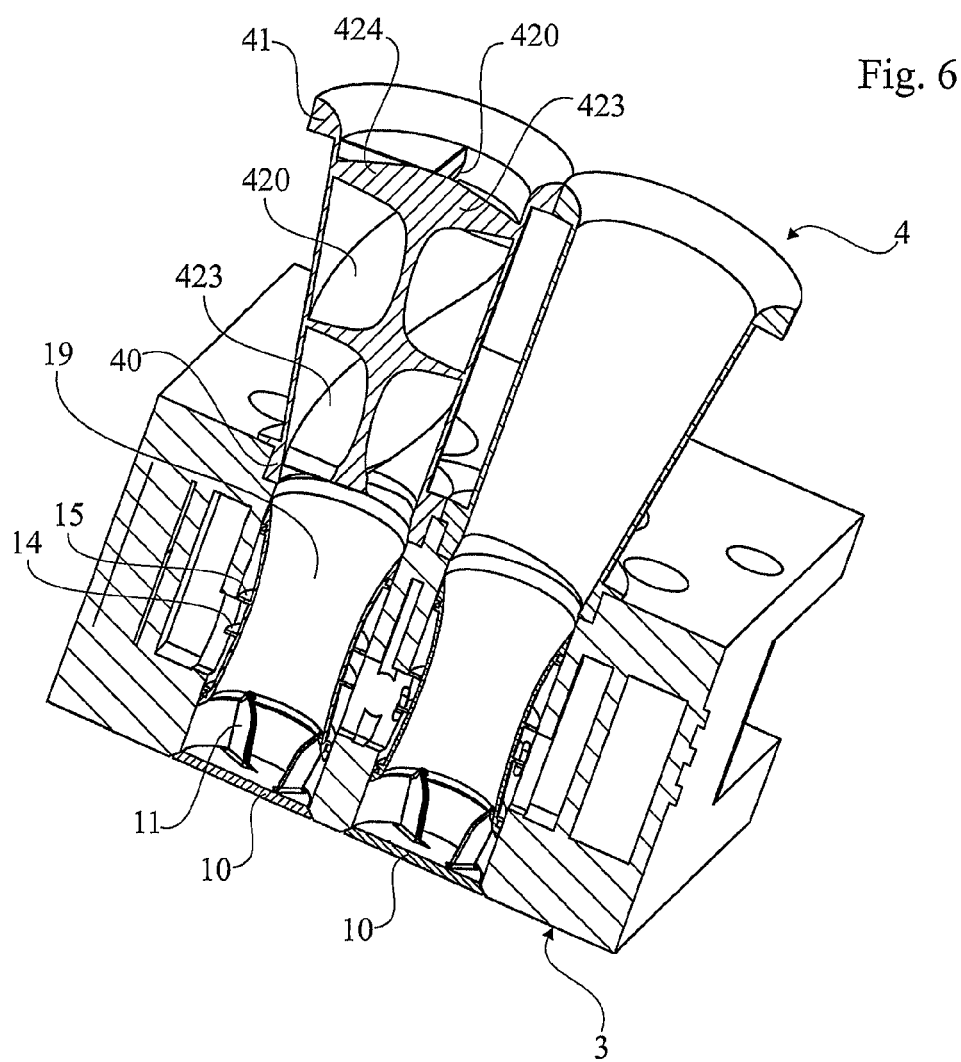
FIG. 6 is a cross-sectional view showing some further modification.

In FIG. 6 there is shown a further cross-sectional view according to the invention, wherein the valve plates 10 are positioned in their sealing positions. Further it is shown that the support rods 11 according to this embodiment has a radial extension that is relatively large, e.g. 30-50% of the radius, and being relatively thin to provide a specific kind of influence on the flow of the gas mixture in and out of the valve unit 1. Further this cross-section shows that if desired the partitioning walls 420, 421, 422, 423 may be designed to provide a thread-like flow pattern (e.g. swirl) for the air and also extending all the way between the inlet 41 to the outlet 40 of the nozzle 4.

Figure 7:
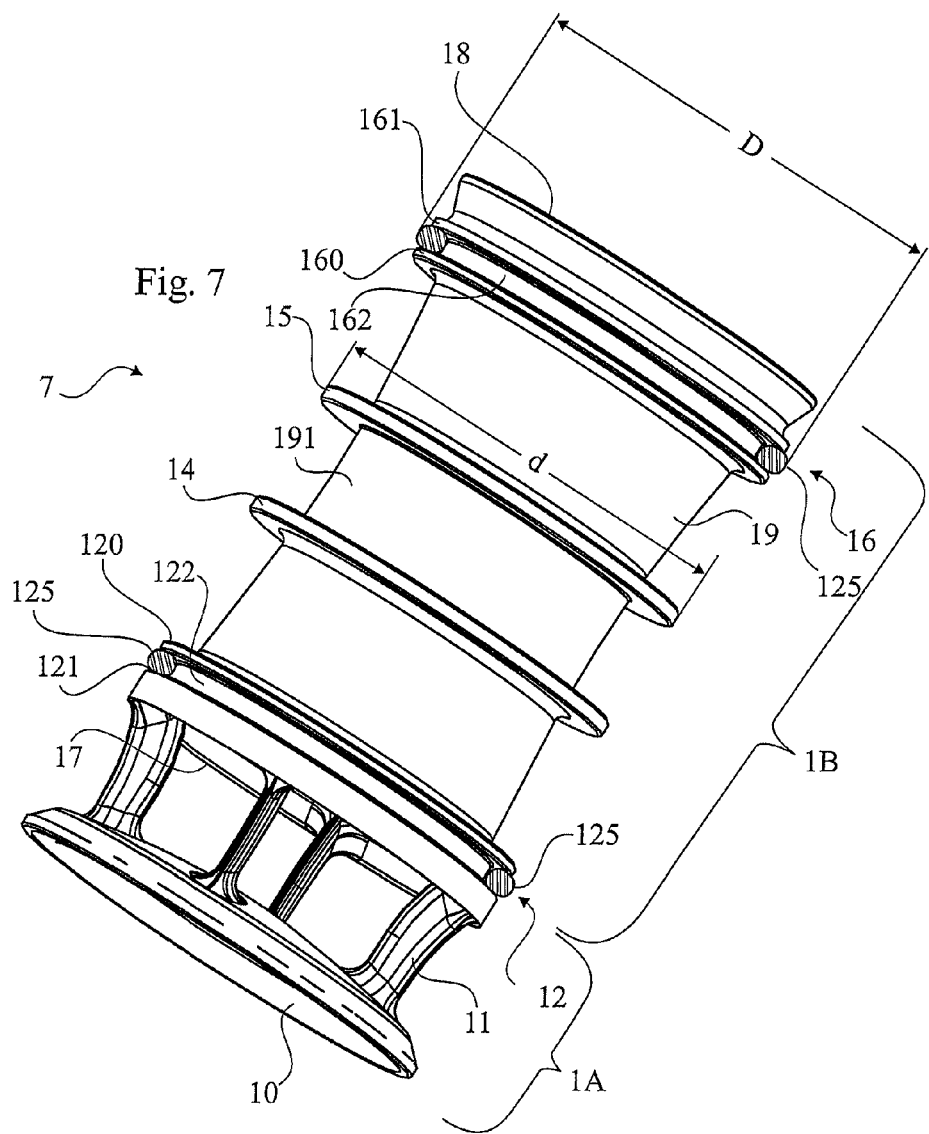
FIG. 7 shows a perspective side view of a valve unit according to the invention.

In FIG. 7 there is shown a side view, in perspective, of a first embodiment of a valve unit 1 according to the invention. Most of the features shown in the figure have already been described above and will not be described again. As can be seen there is formed a recess 122, 162 at each sealing device 12, 16, to retain an annular sealing device 125. Each recess 162, 122 is preferably formed by flange-like protrusions 160, 161; 120, 121. Further it is shown that the hollow annular body 19 is arranged with an outer surface having a larger diameter near its end portions than at the centre portion. As a consequence there will be formed sufficient space 13 in the area of the interacting devices 14, 15 to easily fit different types of second interacting devices 53, 54. Further it is seen that the maximum diameter d of said first interacting devices 14, 15 is less than the diameter D of the sealing devices 12, 16, such that first interacting devices 14, 15 may move into the annular cavity 200 forming a part of the sealing surfaces of the valve housing 2 without contacting the surfaces thereof.

Figure 8:
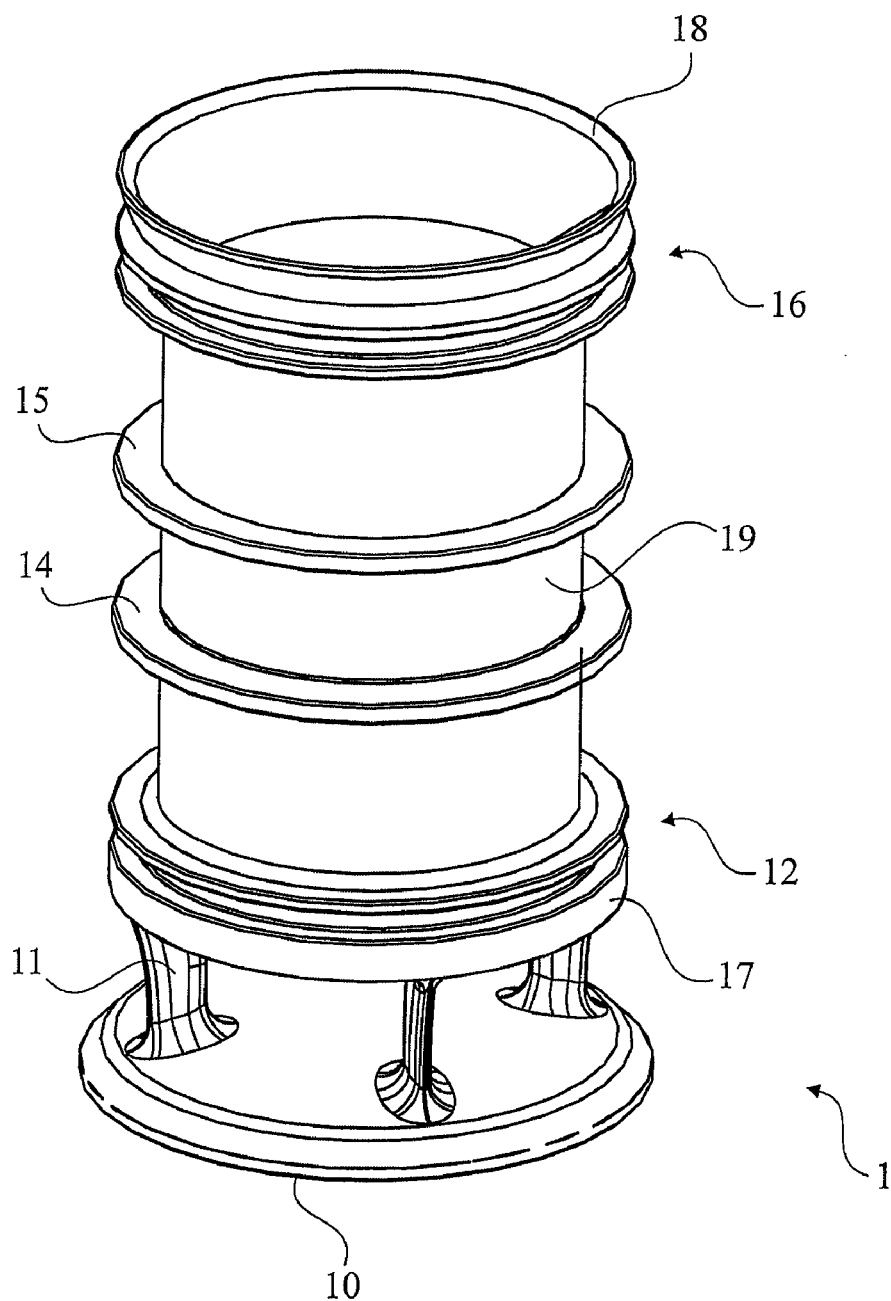
FIG. 8 shows a perspective side view of a second embodiment of the valve unit according to the invention, and, FIG. 9 shows a perspective view from the side and from above of a third embodiment of a valve unit according to the invention.

In FIG. 8 there is shown a further embodiment of a valve unit 1 to be used with the invention, which in substantial aspects is similar to the design shown in FIG. 7. An essential difference is that the hollow annular body 19 according to FIG. 8 is cylindrical, which in some applications may be advantageous, e.g. the ability of more cost efficient production. Also in this embodiment, the first interacting devices 15, 14 presents a maximum diameter d that is less than the diameter D presented by the sealing device. However, it is to be understood that in some applications, especially if using the design depicted in FIG. 1, the first interacting devices 14, 15 may present a maximum diameter d' (not shown) that may be larger than the diameter D of the sealing devices 12, 16, since in such an embodiment they may be positioned not to move into the casings.

Figure 9:
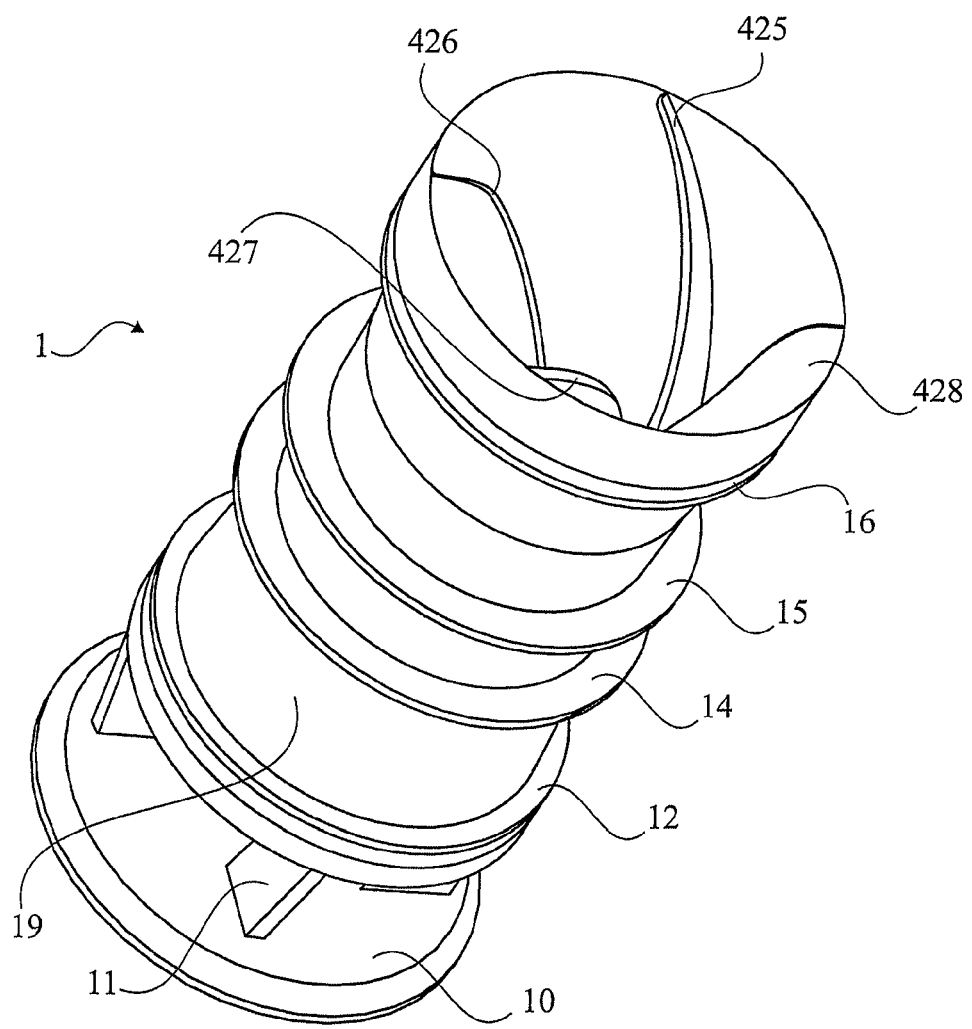

In FIG. 9 there is shown a third embodiment of a valve unit 1 to be used with the invention, which in substantial aspect is similar to the design shown in FIGS. 7 and 8. An essential difference is that the hollow annular body 19 along its inner periphery has been provided with swirl creating ribs 425-428, extending helically along the inner wall from the upper opening to the lower opening. Thanks to the positioning of such swirl creating means 425-428 further optimisation may be achieved, e.g. by totally eliminating an insert 42 in the inlet nozzle 4 or by combining an insert 42 in the inlet nozzle 4 with also having the swirl creating means 425-428 in the valve unit 1. Moreover, FIG. 9 depicts further advantage with the disclosed embodiment in that the ribs 425-428 forming the swirl creating means will form an integrated part of the support rods 11, for the valve plate 10.

The invention is not limited by the embodiments described above but may be varied within the ambit of the appended claims. For instance the skilled person realises that in some applications there is no need for interacting devices at two positions of the valve (as depicted in the embodiments), but that in some instances one interacting device on the valve unit 1 and lifting arm 5, respectively, may be sufficient. Further, the skilled person realises that also other different kind of power mechanisms, than those disclosed above, may be used to effect the movement of the valves, e.g. electrical or pneumatic. Moreover it is evident that at least some portions of the housing and/or control devices within the cylinder body 64 (and/or corresponding members if pneumatic or electric) may be integrated into any detail adjacent the valve arrangement, e.g. the cylinder head 3. Moreover the control mechanisms 5, 6 may include sensors and/or processing means (e.g. a chip) integrated into the mechanism itself. Another evident modification is that the insert within the valve could have a number of passages within a varying range, e.g. 2, 3, 4, 5, 6, etc. Also it is evident that the valve housing may be angled differently than shown in the figures, e.g. at angle within the range of 1°-45° in relation to the extension of the cylinder axis. This may for instance be achieved by modifying the seals 12, 16 to be equipped with a pair of sealing rings 125 at each end (or indeed numerous rings), which will improve stability of the movement. Further, the skilled person also realises that it is possible to position a sealing device fixedly attached to the casing (or valve housing) instead of to the valve unit or indeed to have sealing devices arranged onto both. Further the skilled person realises that a sealing ring may be attached by various means other than recesses. As is evident to the skilled person fuel injectors may be applied and positioned in various manners in combination with the invention, e.g. the designs described above. However, in some applications it may be advantageous to position the injector nozzle (not shown) within the inlet nozzle 4, preferably by being positioned centrally in the inlet nozzle 4 to form a bulb-shaped portion in the centre of the insert 42, since having the injector nozzle positioned close to the cylinder space may in many applications be advantageous. Finally it is to be understood that many of the features described above (e.g. the design of the inlet nozzle per se, the design of any or all of the different the valve lifting mechanisms per se) may be made the subject for a separate protection by means of filing one or more divisional applications

The invention claimed is:

1. Valve arrangement in a combustion engine for controlling inlet and outlet of gas mixtures, comprising a valve (1) slidably arranged within a housing (2) in a cylinder head (3) of the combustion engine, said valve (1) including a valve plate (10) and a stem like portion (1A, 1B), said stem like portion (1A, 1B) having an upper portion (1B) fixedly attached with its lower end to, a lower portion (1A), said lower portion (1A) having said valve plate (10) attached thereto which valve plate interacts with a valve seat (30) to allow for outlet and inlet of gases respectively, a valve control mechanism (5, 6) to control the movement and/or position of said valve (1), wherein said upper portion (1B) forms a hollow annular body (19) extending coaxially with the extension of said stem like portion to allow for said gases to be transported through the valve (1) in a channel within and formed in said annular body (19), the valve plate (10) is connected to the lower portion (1A) to form a gap between the valve plate (10) and the upper portion (1B) to allow for said gases to be transported past the valve plate into or out from the inside (190) of said hollow annular body (19), characterised in that the upper end (18) of said annular body (19) is open and said hollow annular body (19) at its outer side (191) is arranged with at least one first interacting device (14, 15) arranged to interact with at least one second interacting device (53, 54) of the valve control mechanism (5, 6) to facilitate said movement and positioning.

2. Valve arrangement according to claim 1, characterised in that sealing devices (12, 16) are arranged above and below said first interacting device (14, 15) arranged to seal from above and below within the space (13) formed in between the two sealings (12, 16) on the outer side (191) of said hollow annular body (19).

3. Valve arrangement according to claim 2, characterised in that said sealing devices (12, 16) are fixedly attached to said valve (1).

4. Valve arrangement according to claim 3, characterised in that said sealing devices (12, 16) comprises at least one recess (122, 162) arranged to retain an annular sealing member (125).

5. Valve arrangement according to claim 4, characterised in that the maximum diameter (d) of said first interacting device (14, 15) is less than the maximum diameter (D) of said sealing devices (12, 16).

6. Valve arrangement according to claims 1, 2, 3, 4 or 5, characterised in that said first interacting device (14, 15) is formed to protrude from the outer surface (191) of said annular hollow body (19).

7. Valve arrangement according to claims 1, 2, 3, 4 or 5, characterised in that an essential portion (5) of said valve control mechanism (5, 6) is positioned within said cylinder head (3) substantially laterally in relation to the longitudinal extension of the valve (1).

8. Valve arrangement according to claim 7, characterised in that the height requirement within said cylinder head (3) of the valve control mechanism (5, 6) in the longitudinal extension of the valve (1) is less or equal to the length of the through hole (20) for the valve (1) in said cylinder head (31).

9. Valve arrangement according to claim 8, characterised in that parts (5) of said valve control mechanism (5, 6) that are positioned on the upper surface (32) of a base plate (30) of said cylinder head (3) have a height requirement that is less than the corresponding height requirement of the valve (1).

10. Valve arrangement according to claim 1, characterised in that said lower portion (1A) comprises a number of support rods (11) formed in a manner to improve the flow conditions in and out from said valve (1) respectively, and preferably that at least the central portion of said valve plate (10) is substantially flat.

11. Valve arrangement according to claims 1, 2, 3, 4, 5 or 10, characterised in that above said upper portion (1B) there is arranged an inlet nozzle (4) attached to an upper end of said housing (2).

12. Valve arrangement according to claims 1, 2, 3, 4, 5 or 10, characterised in that flow directional means (42) are provided.

13. Valve arrangement according to claim 12, characterised in that said flow directional means (42) is arranged inside said inlet nozzle (4) is and/or inside said valve housing (19).

14. Valve arrangement according to claims 1, 2, 3, 4, 5 or 10, characterised in that said housing (2) forms a coaxially extending annular channel (20).

15. Valve arrangement according to claim 14, characterised in that adjacent the middle of said annular channel (20) there is arranged at least on edge (22A, 23A) forming an opening (13).

16. Valve arrangement according to claim 10, characterised in that said inlet nozzle is movably attached to said end of the housing (2), preferably by means of threads, to facilitate adjustment of the position of said nozzle (4).

* * * * *